United States Patent [19]

Biedermann

[11] 3,911,565

[45] Oct. 14, 1975

[54] METHOD OF PROTECTING CURRENT LEADS IN ELECTROLYTIC CELLS

[75] Inventor: Allen J. Biedermann, Corpus Christi, Tex.

[73] Assignee: PPG Industries, Inc., Pittsburgh, Pa.

[22] Filed: May 24, 1974

[21] Appl. No.: 473,041

[52] U.S. Cl. .................. 29/624; 29/447; 29/628; 174/72 B; 204/242; 204/297 R
[51] Int. Cl.² .................. H01B 13/06; C25D 17/04
[58] Field of Search ............ 204/194, 227, 239–242, 204/272, 279–281, 286, 290 R, 290 F, 291–293, 297 R; 136/175; 29/592, 624, 446, 447, 458, 628, 2; 174/72 B, DIG. 8

[56] References Cited
UNITED STATES PATENTS

| | | | |
|---|---|---|---|
| 2,742,419 | 4/1956 | Baker et al. | 204/266 X |
| 3,409,536 | 11/1968 | Barber et al. | 204/242 X |
| 3,436,324 | 4/1969 | Hass et al. | 204/242 X |
| 3,518,359 | 6/1970 | Trimble et al. | 29/447 X |
| 3,527,688 | 9/1970 | Giacopelli | 204/242 |
| 3,583,898 | 6/1971 | Giacopelli | 204/266 X |
| 3,642,604 | 2/1972 | Giacopelli | 204/266 X |
| 3,743,592 | 7/1973 | Metcalff | 204/279 X |
| 3,816,171 | 6/1974 | Toth et al. | 174/DIG. 8 X |

*Primary Examiner*—C. W. Lanham
*Assistant Examiner*—Joseph A. Walkowski
*Attorney, Agent, or Firm*—Richard M. Goldman

[57] ABSTRACT

Disclosed is a method of preparing an anode unit for an electrolytic cell. The anode unit includes a concrete cell bottom, a lead anode base within the concrete cell bottom, an electroconductive metal conductor bar imbedded in the lead anode base conducting electrical current to the lead anode base, and anodes imbedded in and extending from the lead anode base. According to the disclosed method of preparing the anode unit, the electroconductive metal bar is heated and a heat shrinkable sleeve is applied around the electroconductive metal conductor bar. The sleeve is prepared from a thermoplastic resin that has been rendered thermosetting by irradiation. The bar is in juxtaposition with the anodes, and molten lead is poured into the concrete cell bottom in contact with the electroconductive metal conductor bar and the anodes to fuse the electroconductive metal bar and the anodes into a single electroconductive unit.

5 Claims, 3 Drawing Figures

METHOD OF PROTECTING CURRENT LEADS IN ELECTROLYTIC CELLS

BACKGROUND

Alkali metal chloride brines may be electrolyzed to yield alkali metal hydroxide, hydrogen, and chlorine in diaphragm cells. One type of diaphragm cell commonly in use is the monopolar diaphragm cell having graphite anodes. In monopolar diaphragm cells having graphite anodes, the anodes are fused in lead and extend upwardly from the lead base into the cell chamber. In the operation of these cells current is fed to the cell by a copper bus bar joining the cathode cell can of the prior cell to a copper or other electroconductive metal conductor bar which is fused into the lead. The electroconductive metal conductor bar extends from a bolted joint with the bus bar to and through the concrete cell bottom into the lead.

A frequent cause of failure of the electroconductive metal conductor bar is corrosion in the region where the electroconductive metal conductor bar passes through the concrete cell bottom into the lead. Attempts to remedy this problem, for example, by the use of stretched rubber sleeves, asbestos packing, sealants, coatings, and the like have met with only limited success. Such materials have either failed to provide a suitable seal around the copper or have themselves been destroyed by the cell conditions and cell assembly process.

SUMMARY

It has now been found that a substantial reduction of damage to the electroconductive metal conductor bar where the bar passes through the concrete and is immersed in the lead is provided by a heat shrinkable sleeve prepared from a polymeric material that has been rendered heat shrinkable by exposure to irradiation. According to this invention, such a sleeve is provided around the electroconductive metal conductor bar. The electroconductive metal conductor bar is then placed through the aperture or opening in the side wall of the concrete cell bottom and molten lead is poured around the electroconductive metal conductor bar.

DETAILED DESCRIPTION

The invention may be understood with reference to the appended figures.

Figure 1:
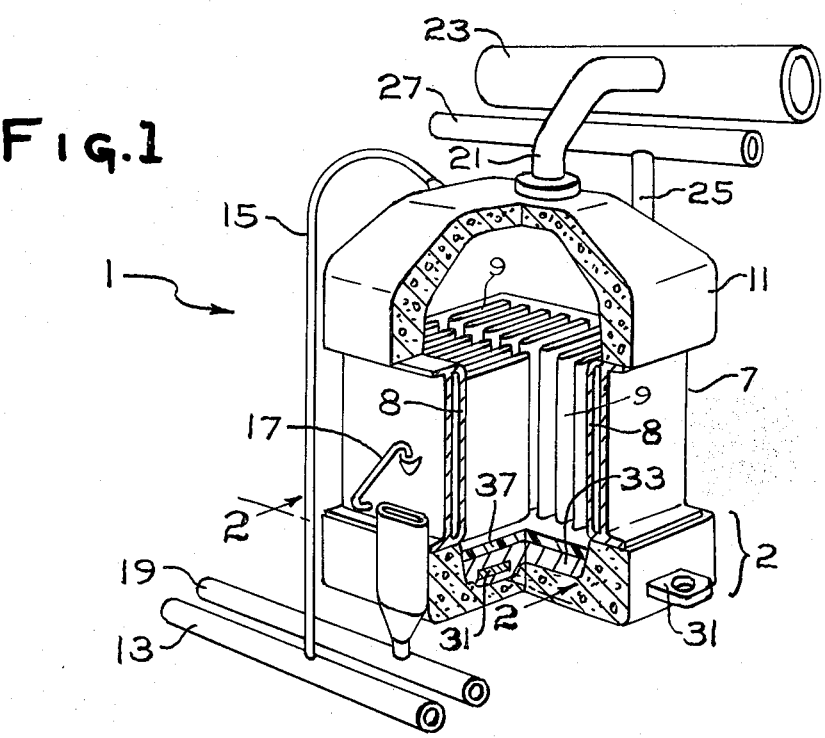
FIG. 1 is a partial cutaway isometric view of a monopolar diaphragm cell.

As shown in FIG. 1 a monopolar diaphragm cell 1 includes an anode unit 2 containing a concrete cell bottom 3 with graphite anodes 5 extending upwardly therefrom, a cathode unit having asbestos covered cathodes 9 therein and a cell top 11.

A typical monopolar 1 includes a brine feed line 13 for feeding brine into the cell chamber through brine inlet 15 and a caustic outlet, i.e., perc pipe 17, for recovering catholyte liquor from the cell and feeding it to a catholyte liquor header system 19. The cell 1 also has a chlorine gas outlet 21 extending from the cell top 11 to a chlorine header 23 and a hydrogen outlet 25 extending from the cell can 7 to a hydrogen header 27. The entire cell 1 rests on a plurality of insulators, not shown. Current is supplied to the cell 1 through an anode conductor 31 from the cathode bus bars of the cell can of the prior cell in the circuit.

Figure 2:
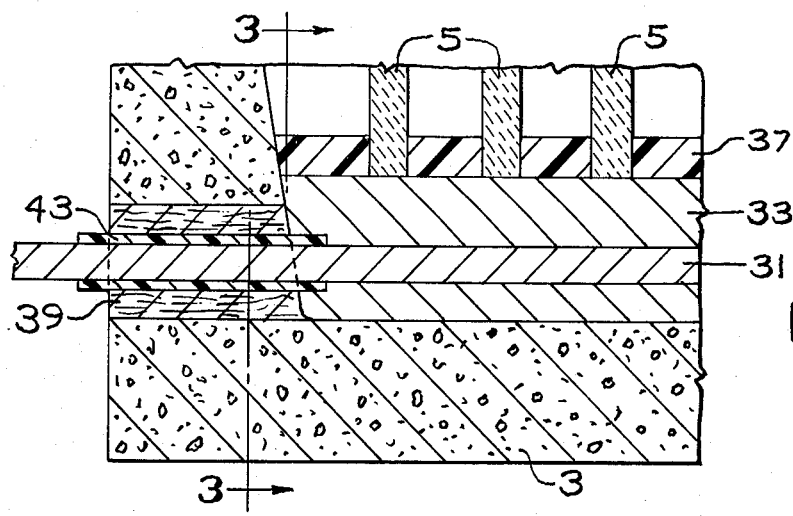
FIG. 2 is a view through 2—2 of FIG. 1 showing the cell bottom structure.
Figure 3:
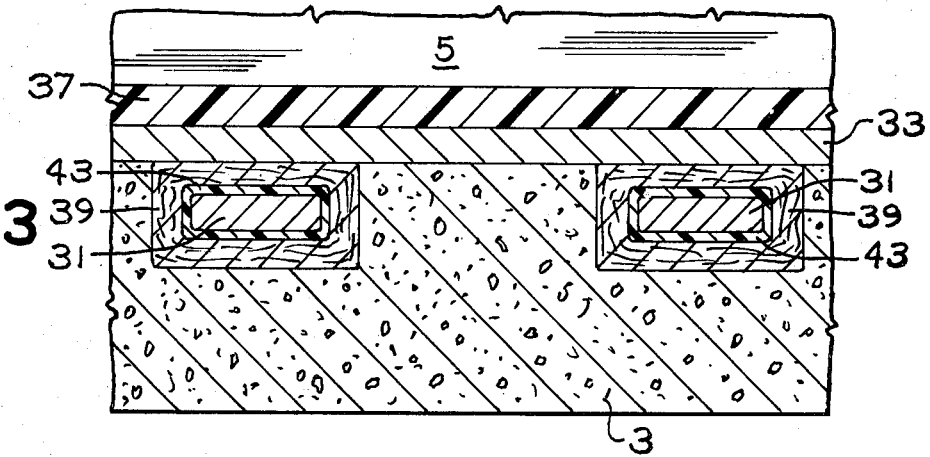
FIG. 3 is a view through plane 3—3 of FIG. 2 showing another view of the cell bottom structure.

Turning now to FIGS. 2 and 3, the interior of the cell is shown in greater detail. The anode unit 2, including lead layer 33 and anode blades 5, rests in the concrete cell bottom 3. The lead layer 33, which may be provided by lead or by a lead alloy such as an alloy of tin and lead or antimony and lead, typically has a thickness of from about 1 inch to about 3 or 4 inches. The thickness of the lead layer 33 should be sufficient to provide structural support for the anode and electrical conductivity from the electroconductive metal conductor bar 31 through the lead 33 to graphite anodes 5. The term "lead anode base" as used herein includes bases fabricated of lead-tin alloys and lead-antimony alloys as described hereinabove.

The electroconductive metal conductor bar 31, which is also referred to as a bus bar, or as an electroconductive bar, is fabricated of an electroconductive metal. Most frequently, the electroconductive metal conductor bar 31 is fabricated of copper. However, it may also be fabricated of aluminum or copper-clad aluminum. When the electroconductive metal conductor bar 31 is fabricated of copper, it may have a thin film or coating of tin or of a lead-tin alloy thereon in order to provide increased electrical conductivity between the electroconductive copper bar 31 and the lead 33. The electroconductive metal conductor bar 31 extends through an aperture in a lip or side wall of the concrete cell bottom 3 to the lead 33 and is imbedded in the lead 33.

The graphite anodes 5 are imbedded in the lead 33 and extend upwardly therefrom. The anode blades 5 may either be solid monolithic graphite or they may be porous graphite, for example with catalytic materials dispersed therein such as lead dioxide, lead oxide, or various spinel-type materials.

The cathode unit includes a cathode cell can 7 which serves as the external wall of the cathode unit. The cell can 7 may be fabricated of iron, steel, copper, nickel, cobalt, or any material which is electrically conductive and chemically resistant to basic media. Cathode bus bar leads extend from the cell can 7 to the next adjacent cell in the circuit.

The cell can 7 includes the cell liquor recovery means 17, that is, the caustic soda-sodium chloride recovery means in the case of an electrolytic cell used for the electrolysis of sodium chloride brine and the potassium hydroxide-potassium chloride recovery means in the case of a cell used for the electrolysis of potassium chloride. This catholyte recovery means 17 is referred to as a perc pipe.

The cathode cell can 7 includes an inner peripheral wall 8 substantially parallel to the external wall of the cell can 7 and spaced from the external wall of the cell can 7. Extending from the inner peripheral wall 8 are a plurality of hollow cathodes 9. The hollow cathodes 9 are connected to and extend substantially perpendicularly from one inner peripheral wall 8 toward the opposite inner peripheral wall 8 and may in some cell designs be connected to and extend substantially perpendicularly between a pair of facing inner peripheral walls 8.

The inner peripheral wall 8 and cathode fingers 9 are fabricated of an electroconductive material, resistant to basic media under cathodic conditions, and resistant to hydrogen embrittlement under cathodic conditions. Such materials include iron, steel, copper, cobalt, nickel, and the like.

The inner peripheral wall 8 and the hollow cathode fingers 9 are electrolyte permeable so as to allow the electrolyte to percolate through a diaphragm or a permionic membrane into the cathode fingers. This electrolyte permeability may be provided by fabricating the cathode fingers 9 and inner peripheral wall 8 out of metal screen, expanded metal mesh, or perforated metal plate.

A permeable barrier is provided on the inner peripheral wall 8 and on the cathode fingers 9. This permeable barrier is provided on the external surface of the inner peripheral wall and the cathode fingers.

The permeable barrier may be a brine electrolyte permeable diaphragm. Such brine electrolyte permeable diaphragms are typically prepared of asbestos fibers or asbestos paper sheet and have a thickness in terms of pounds of asbestos per square foot of electrode area of from about 0.25 to about 0.5 pounds of asbestos per square foot of electrode area. However, this thickness may be reduced somewhat, e.g., to 0.20 pounds per square foot, by treatment of the asbestos fiber diphragm with various agents such as silicates, fluorocarbon resins, chlorocarbon resins, and the like.

Alternatively, the permeable barrier may be provided by an ion permeable, brine electrolyte impermeable metal barrier, such as a permionic membrane or an ion exchange membrane. Such membranes are typically provided by fluorocarbon resins having ion exchange groups thereon.

The permeable barrier serves to divide the electrolyte volume into an anolyte and a catholyte chamber. The catholyte chamber is the volume within the cathode fingers surrounded by the permeable barrier and the volume between the inner peripheral wall and the cell can. The remainder of the electrolyte chamber is the anolyte chamber.

In the operation of a monopolar diaphragm cell as described herein to produce sodium hydroxide and chlorine, the brine feed is saturated sodium chloride brine containing from about 315 to about 335 grams per liter of sodium chloride. The anolyte is an acidified sodium chloride solution containing from about 200 to about 250 grams per liter of sodium chloride at a pH of from about 2.5 to 4.5 while a typical catholyte cell liquor contains from about 135 to about 150 grams per liter of sodium hydroxide and from about 170 to about 225 grams per liter of sodium chloride. Within the anolyte chamber chlorine is evolved at the anode, and within the catholyte chamber hydrogen is evolved at the cathode.

In the assembly of the anode unit 2, the electroconductive metal conductor bar 31, most frequently copper, is tinned with a thin coating of either tin or a lead-tin alloy. This enhances the electroconductivity of the contact between the lead 33 and the copper electroconductive metal conductor bar 31. The tinning is accomplished by inserting the copper bar 31 into molten tin or molten tin-lead alloy at a temperature above the melting point of the tin or the tin-lead alloy, e.g., above about 437°F, but generally below about 527°F. The coated copper bar 31 is then inserted through an aperture in the side walls of a steel anode unit mold. The side walls or lips of the steel anode unit mold are of a height sufficient to contain the lead, for example from about 2 to about 5 inches. The conductor bar 31 and the graphite anodes 5 are held in place in juxtaposition to each other by a jig, frame, or template in combination with the steel anode unit mold. Thereafter, molten lead is poured into the steel anode unit mold. The lead, which may also be in the form of a lead-tin alloy or a lead-antimony alloy, has a melting point of about 612°F for pure lead. The lead is typically poured at a temperature of from about 615°F to about 630°F. The molten lead fuses around the components in the steel anode unit mold, that is, around the anodes 5 and the electroconductive metal conductor bar 31. The anode unit, i.e., the lead base 33, with the graphite anode blades 5 and the conductor bar 31, is removed from the steel anode unit mold and inserted in the concrete cell bottom 3, such that the electroconductive metal conductor bar 31 extends through an aperture or hole in a side wall of the concrete cell bottom. The lead base 33 is then coated and sealed with mastic. The hole or aperture in the side wall of the concrete cell bottom 3 is then packed with asbestos 39.

The particular problem area is the copper-lead interface near the aperture in the concrete cell bottom 3. The small segment of copper within this range is highly susceptible to corrosion and is the most frequent site of failure of the copper electroconductive metal conductor bar 31.

According to this invention a heat shrinkable sleeve 43 is applied around the electroconductive metal conductor bar 31 so that the portion of the bar 31 passing through the asbestos packed hole in the concrete cell bottom 3 and the initial portion of the bar 31 imbedded in the lead 33 is sealed within the sleeve 43.

As can be seen from FIGS. 2 and 3, the concrete cell bottom 3 has the electroconductive metal conductor bar 31 and the packing 39 passing through a hole. According to this invention, the conductor bar 31 has the sleeve 43 thereon. The sleeve 43 extends into and through the hole in the side wall of the concrete bottom 3 and into the lead 33.

According to one exemplification of this invention, the sleeve 43 is installed on the electroconductive metal conductor bar 31 while the bar 31 is at a temperature sufficient to shrink the sleeve 43.

According to one exemplification, the sleeve may be placed on the bar 31 while the bar 31 is at room temperature and thereafter the sleeve 43 may be heated, for example with a torch or flame or in a furnace. However, a preferred method, because of uniformity of results and ease of assembly, is to apply the sleeve 43 shortly after tinning the copper electroconductive metal conductor bar 31. According to this method, the copper bar is tinned, for example with molten tin, or a molten lead-tin alloy such as an alloy of 40 to 60 weight percent lead, balance tin, at a temperature above about 437°F up to about 527°F. Then, the copper electroconductive metal conductor bar 31 is allowed to partially cool, for example by standing in air, to a temperature below that at which the sleeve is charred or decomposed, e.g., below about 500°F but high enough to shrink the sleeve, e.g., above about 200°F and preferably above about 250°F. The sleeve is then placed around the copper electroconductive metal conductor bar 31. In this way, the sleeve is heated by the sensible heat of the copper electroconductive metal conductor bar 31 and shrinks to provide a tight seal thereby substantially reducing corrosion of the copper electroconductive metal conductor bar 31.

The copper electroconductive metal conductor bar 31 having the sleeve 43 thereon is then inserted through the aperture in the side of the concrete cell bottom 3 and the lead 33 is poured as described hereinabove.

According to still other exemplifications of this invention, the sleeve 43 may be inserted around the cold bar 31 and the bar then heated or the sleeve may be inserted around the cold bar 31 and the molten lead poured thereafter.

Additionally, a rubber mastic adhesive may be provided between the electroconductive metal conductor bar 31 and the sleeve 43. Preferably the rubber mastic adhesive should remain live and flexible at the temperatures normally encountered in cell operation.

The preferred heat shrinkable sleeves have a linear size reduction, i.e., a linear shrinkage, of at least about 35 percent. Such sleeves are typically prepared from a polymer that becomes capable of crosslinking upon exposure to irradiation in the range of about $10^9$ to about $10^{10}$ rads. The preferred polymers are those having, after exposure to radiation, an enhanced tensile strength, an enhanced elastic modulus, an enhanced sheer strength, and an enhanced plasticity at slightly elevated temperatures. That is, after exposure to radiation, the preferred polymers become plastic or tacky rather than flowable at elevated temperatures. The shrinkage normally occurs at the temperatures at which the polymers exhibit this plastic or tacky property. Such polymers while thermoplastic prior to irradiation are characterized by becoming thermosetting after irradiation. Generally the preferred polymers are referred to in the literature as polymers that become crosslinking upon exposure to radiation with substantially little, if any, polymer degradation or gas evolution.

While not wishing to be bound by this explanation, it is believed that this heat shrinkable behavior of the polymer after irradiation is due to the creation of free radical sites during the irradiation. The polymer systems most susceptible to this behavior are those having olefinic unsaturation with hydrogen on at least alternate carbon atoms. The free radical sites are substantially immobile at room temperature, but at higher temperatures, where the polymer begins to exhibit plastic or tacky behavior, the free radical sites exhibit some mobility. This mobility allows crosslinking to occur, resulting in a crosslinked polymer system having a higher density than the original substantially uncrosslinked polymer system. As the crosslinked polymer has a higher density than the substantially uncrosslinked polymer, there is to be a tendency upon crosslinking for the material fabricated of the polymer to shrink.

The polymers exhibiting such behavior include the polyolefins ($-R_1R_2C-CR_3R_4-$) such as polyethylene, polypropylene, and polystyrene; polyacrylates $(-R_1R_2C-CR_3COOH-)$ such as polymethacrylate, polymethyl methacrylate, and polyethyl methacrylate; polyacrylamides; polyvinylchloride ($-CH_2-CHCl-$); polyvinylfluoride ($-CH_2-CHF-$); polyamides ($-R_1R_2C-(H_2-NH-CO-)$; polyesters; polyvinylpyrolidone ($-C_4H_6NO)CH-CR_1R_2-$); polysiloxanes ($-R_1R_2SiO-$); polyvinylalcohols ($-R_1HC-CHOH-$); and polyacroleines ($-H_2C-CR_1-CHO-$); where $R_1$, $R_2$, and $R_3$ are hydrogen atoms, aryl groups or alkyl groups and where hydrogen atoms are present on alternating carbon atoms. Particularly preferred for this application are heat shrinkable sleeves prepared from the polyolefins such as polyethylene, polypropylene, and polystyrene, and from polyvinylfluoride, and polyvinylchloride. These materials are preferred because of their cost and availability and especially in the case of polyvinylfluoride and polyvinylchloride, their resistance to the cell plant environment.

The preferred shrinkable sleeves are prepared from those irradiated resins having, after irradiation, a thermal degradation temperature perferably greater than 465°F and a shrinking temperature, which corresponds to the plastic temperature or second transition temperature, of at least 180°F but preferably not significantly greater than about 400°F. While such desirable properties may not always be readily attainable, the preferred heat shrinkable materials are generally the polyolefins, as polyethylene, polypropylene, and polybutylene, polyvinylchloride, and polyvinylfluoride, all of which normally exhibit a plastic temperature of about 180°F or higher and do not decompose or degrade at temperatures below about 400°F. Preferably, the materials do not degrade or decompose when in contact with molten lead in the substantial absence of oxygen at temperatures above the melting point of molten lead. It is for this reason that polyolefins, as polyethylene, polypropylene, and polybutylene, and polvinylfluoride and polyvinylchloride are particularly preferred.

Although the invention has been described with reference to particular specific details and certain preferred exemplifications thereof, it is not intended to thereby limit the scope of this invention except insofar as the details are recited in the appended claims.

I claim:

1. In a method of preparing an anode unit for an electrolytic cell, which anode unit comprises:
   a. a cell bottom;
   b. a lead anode base in the cell bottom;
   c. an electroconductive metal bar imbedded in said lead anode base for conducting electrical current thereto and extending outwardly from the cell bottom and the lead anode base;
   d. an anode imbedded in and extending upwardly from said lead anode base;
   wherein said anode unit is prepared by the method comprising:
   a. placing said electroconductive metal bar and said anode into juxtaposition with each other within a cell mold;
   b. providing molten lead in the cell mold in contact with said electroconductive metal bar and said anode whereby to fuse said electroconductive metal bar and anode; and
   c. placing the lead anode base in the cell bottom whereby the anode extends upwardly therefrom and the electroconductive metal bar extends outwardly therefrom through an aperture in a side wall of the cell bottom;
   the improvement comprising sealing the joint between the electroconductive metal bar and the lead anode base where the electroconductive metal bar extends through the aperture in the side wall of the cell bottom by applying a heat shrinkable sleeve prepared from a thermoplastic resin rendered thermosetting by irradiation around said electroconductive metal bar prior to pouring molten lead around said electroconductive metal bar.

2. The method of claim 1 wherein said electroconductive metal bar is a copper bar and said method comprises:

inserting a portion of said copper bar in a molten tin bath to deposit tin thereon; and applying said shrinkable sleeve to said copper bar while said copper bar is at a temperature high enough to shrink said shrinkable sleeve but low enough to avoid the destruction of said sleeve.

3. The method of claim 2 comprising inserting said copper bar in a molten metal bath comprising tin, removing the copper bar from the molten bath, allowing the copper to cool, and applying the heat shrinkable sleeve to the copper bar when the copper bar is at a temperature between about 250°F and about 500°F.

4. The method of claim 1 wherein said sleeve is provided by a polymer prepared from monomeric units having olefinic unsaturation, and said polymer has hydrogen atoms on at least alternate carbon atoms.

5. In a method of preparing an anode unit for an electrolytic cell, which anode unit comprises:

a. a cell bottom;

b. a lead anode base in the cell bottom;

c. a copper bar imbedded in the lead anode base for conducting electrical current thereto, and extending outwardly from the lead anode base and the cell bottom;

d. an anode imbedded in and extending upwardly from the lead anode base;

wherein said anode unit is prepared by the method comprising:

a. placing the copper bar and the anode in juxtaposition with each other in a cell mold;

b. establishing a pool of molten lead in the cell mold in contact with the copper bar and the anode whereby to fuse the copper bar, the anode, and the lead together; and c. placing the lead anode base in the cell bottom whereby the anode extends upwardly therefrom and the copper extends outwardly therefrom through an aperture in the side wall of the cell bottom;

the improvement comprising sealing the joint between the copper bar and the lead anode base at the aperture in the side wall of the cell bottom by placing a heat shrinkable sleeve prepared from a thermoplastic resin rendered thermosetting by irradiation around the copper bar prior to pouring the molten lead around the copper bar.

* * * * *

UNITED STATES PATENT OFFICE
CERTIFICATE OF CORRECTION

PATENT NO. : 3,911,565
DATED : October 14, 1975
INVENTOR(S) : Allen J. Biedermann It is certified that error appears in the above-identified patent and that said Letters Patent are hereby corrected as shown below:

Column 7, line 15, after "copper" please insert --bar--.

Signed and Sealed this tenth Day of February 1976

[SEAL]

Attest:

RUTH C. MASON
Attesting Officer

C. MARSHALL DANN
Commissioner of Patents and Trademarks